Sept. 10, 1968  H. F. KELLER, JR  3,401,101
SEPARATION OF HYDROGEN SULFIDE AND MERCAPTANS
FROM FLUID STREAMS
Filed Aug. 5, 1966  2 Sheets-Sheet 1
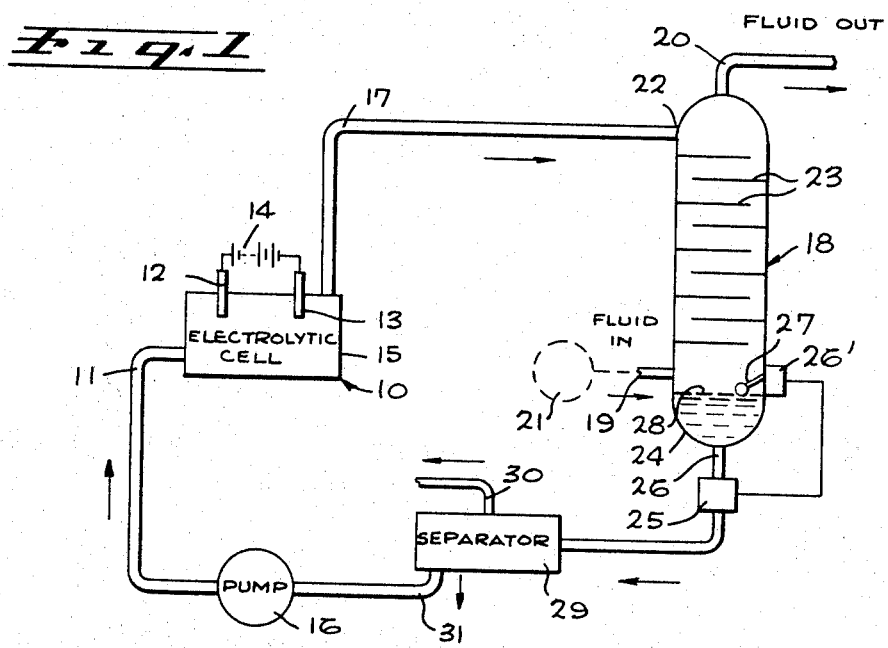
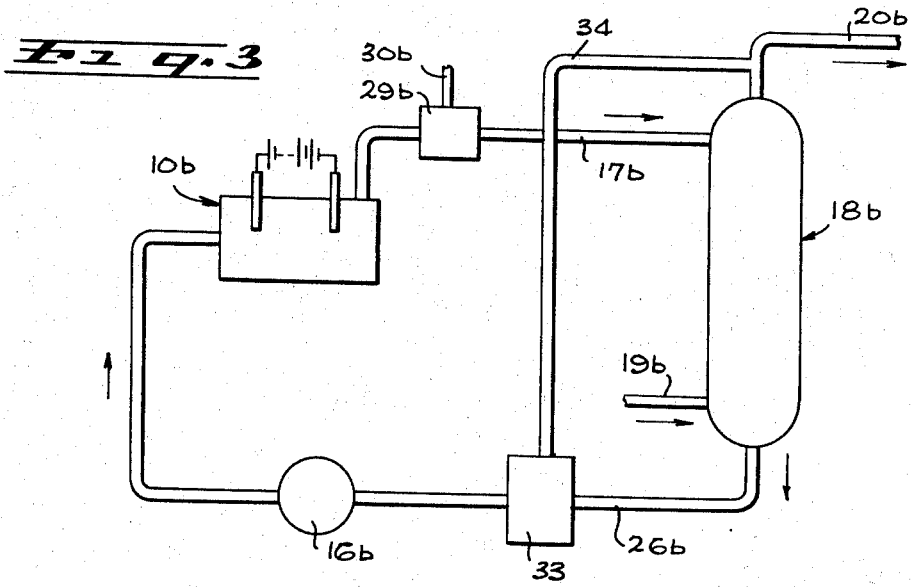
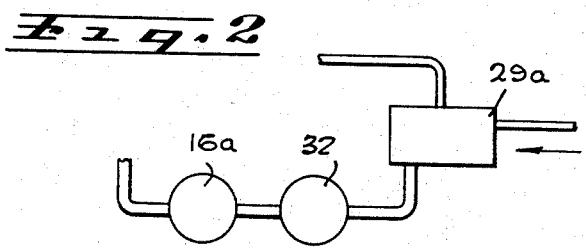
HOWARD F. KELLER, JR.
INVENTOR.
BY William P. Green
ATTORNEY

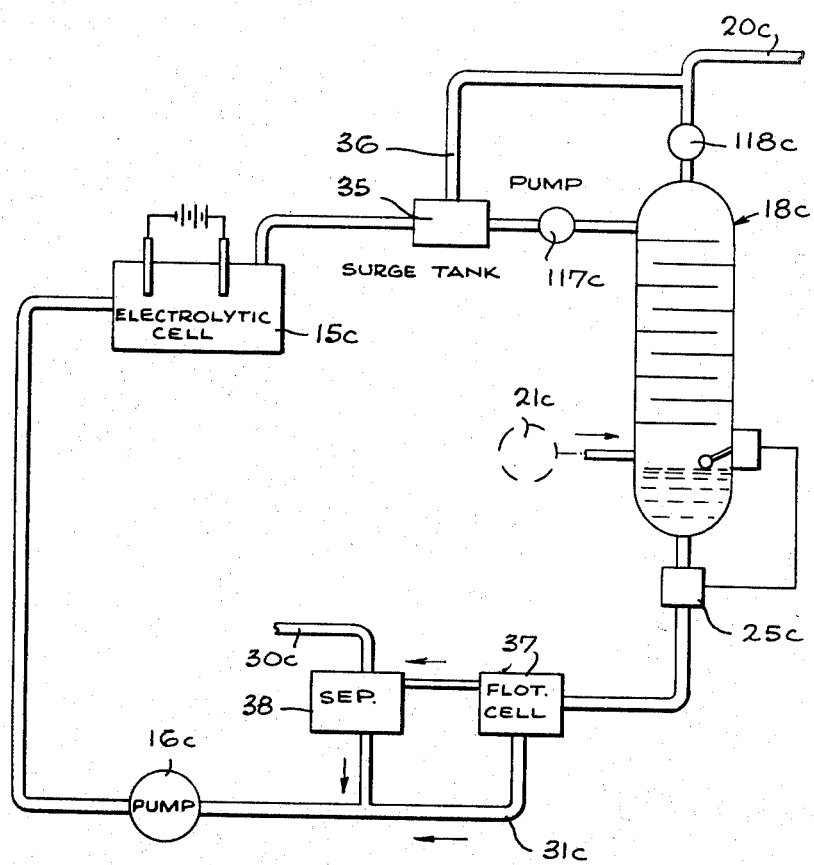

3,401,101
SEPARATION OF HYDROGEN SULFIDE AND
MERCAPTANS FROM FLUID STREAMS
Howard F. Keller, Jr., 4101 Linden Ave.,
Long Beach, Calif. 90807
Continuation-in-part of application Ser. No. 420,072,
Dec. 21, 1964. This application Aug. 5, 1966, Ser.
No. 570,460
12 Claims. (Cl. 204—136)

ABSTRACT OF THE DISCLOSURE

A process for removing the HS radical from a stream of hydrocarbon gas, hydrocarbon liquid, or other fluid being treated, by electrolyzing a solution preferably containing at least one halide selected from the group consisting of potassium iodide, potassium bromide, sodium iodide, sodium bromide, lithium iodide, and lithium bromide, to electrolytically convert at least some of the halide to a tri-halide in the solution, then contacting the fluid to be treated with the solution, reacting the HS radical wih the tri-halide in the solution in a manner forming elemental sulfur and the same halide originally electrolyzed, and repeating all of these steps through a series of cycles of operation to progressive eliminate the HS radical.

---

This application is a continuation-in-part of my copending application Ser. No. 420,072, filed Dec. 21, 1964, and now abandoned, which in turn was a continuation-in-part of my prior application Ser. No. 343,755, filed Feb. 10, 1964, and now abandoned.

The present invention relates to improved methods and apparatus for removing the HS radical (i.e. at least the sulfur content of said radical) from fluids containing hydrogen sulfide and/or mercaptans.

In handling or treating various types of fluids, such as natural gas or other gaseous hydrocarbons, liquid hydrocarbons, or other fluids of various types, it frequently becomes desirable to remove from the gas or liquid stream hydrogen sulfide or a mercaptan. As is well known, these contaminants containing the HS radical are highly corrosive to metal pipelines, scrubbers, and other processing equipment, give the fluid a highly disagreeable odor, and may have other undesirable results.

Various methods have been proposed in the past for removal of hydrogen sulfide and mercaptans from fluid streams. However, each of these prior processes with which I am familiar has had one or more very definite disadvantages in actual practice, which have limited its use and the effectiveness with which the hydrogen sulfide and mercaptans have been removed. For example, one prior process, which utilizes alkanol amine for absorption of hydrogen sulfide, has been limited to only the removal of hydrogen sulfide and not mercaptans; and in addition has been incapable of removing even the hydrogen sulfide unless and until all carbon dioxide is first removed from the gas or liquid. The same disadvantage inheres in another known type of process, which employs a hot aqueous solution of potassium carbonate as its active ingredient. Selective absorption by a molecular sieve has been proposed, but has required extreme conditions for regeneration, and has been ineffective to remove mercaptans. Certain processes employing iron oxide have been suggested, and others employing potassium permanganate or sodium chromate, but each of these has had certain inherent disadvantages definitely precluding its use on any large commercial scale for continuously removing hydrogen sulfide and/or a mercaptan from a gas or liquid stream.

The general object of the present invention is to provide an improved process and apparatus which is capable of removing the HS radical from a fluid containing hydrogen sulfide and/or a mercaptan, and can do so much more effectively and reliably than any other of the prior processes intended for this purpose. Particularly contemplated is a method and related apparatus which can remove these sulfur containing compounds from a gas or liquid stream while carbon dioxide is present in the stream, and without requiring prior removal of the carbon dioxide, and further without affecting the concentration of the carbon dioxide in the fluid. In addition, it is desired that the present process and method employ treating chemicals which may be utilized repeatedly through a series of cycles of operation, and be regenerated after each cycle for re-use, to thereby reduce the overall cost of operation of the system. As will appear, my system converts the sulfur content of the fluid being treated to the form of elemental sulfur, which may then be easily separated from the other materials present.

To accomplish these results, I employ as the treating chemical a solution containing at least one dissolved substance which is electrolytically convertible between a lower oxidation state and a higher oxidation state, and which in its higher oxidation state has a high enough oxidizing potential to oxidize the sulfur of the HS radical from $S^{--}$ to $S^0$. This solution is first passed through an electrolytic cell where at least some of the convertible substance in the solution is changed from the lower oxidation state to the higher oxidation state. The solution is then contacted with the fluid to be treated, to react with the HS radical in that fluid in a manner producing elemental sulfur, and returning the convertible substance to its lower oxidation state. The solution is subsequently recirculated to the electrolytic cell, to be electrolyzed again to the higher oxidation state form for recontacting with the fluid being treated. The elemental sulfur is separated out at some point in the cycle, so that a continuous cycle is provided which enables use of the same convertible solution through many cycles of operation, with some of the HS radical of the treated fluid being removed on each cycle.

The convertible oxidizing substance or substances in the treating solution which is introduced into the electrolytic cell are selected to have the following characteristics:

(1) These substances must of course first of all be capable of existing in two distinct and different oxidation states, that is, two states having different oxidizing potentials, or stated differently, a higher oxidation state having a higher valence (more positive or less negative valence) and a lower oxidation state having a lower valence (less positive or more negative).

(2) The convertible two state oxidizing substances should be soluble in water, or in a glycol, in both of their two states.

(3) These substances should not be of a character to be removed from the solution by the treated fluid in either oxidation state.

(4) The substances should be easily convertible from their lower oxidation states to their higher oxidation states by electrolysis, in an aqueous or glycol aqueous solution.

(5) The substances should have a high enough oxidation potential in their higher oxidation state to oxidize sulfur from S⁻⁻ to S⁰. Stated differently, the oxidation potential in the higher state should be above −.141.

In order to maximize the effectiveness with which the HS radical is removed from the fluid being treated, it is preferred that the two state oxidizing material be composed at least in part of a halide selected from the group consisting of potassium iodide, potassium bromide, sodium iodide, sodium bromide, lithium iodide, lithium bromide, and mixtures thereof, all of which halides are convertible electrolytically to a higher oxidation state in which they exist as a tri-halide (tri-iodide or tri-bromide). As between different members of this broad group, best results are attained when the oxidizing halides are selected from the narrower group consisting of potassium iodide, potassium bromide, sodium iodide, and sodium bromide. Still more specifically, the most permanently stable and otherwise preferred individual halides are potassium iodide and sodium iodide.

In some instances, the oxidizing material in the solution may consist entirely of one or more of the mentioned halides. In many situations, however, it is preferred that the solution also contain at least one additional oxidizing substance which is convertible between two different oxidation states. Desirably, this additional substance is so selected as to coact or interact with the halide in a manner such that each component increases the effectiveness of the other, and of the overall solution, in removing the HS radical. More particularly, it is found that the presence of the halide may serve to catalyze and thereby enhance conversion of the additional oxidizing substance between its two different oxidation states, while that additional substance may in turn serve as a buffering compound for maintaining the pH of the solution above about 7, even though carbon dioxide may be present in the fluid being treated, and may tend to lower the pH below 7.

If only the catalyzing effect is desired in a particular instance, the additional substance which is intermixed with the halide should be selected from the group consisting of the potassium, sodium and lithium carbonates, phosphates, and borates, disodium vanadate, dipotassium vanadate, sodium ferrocyanide and potassium ferrocyanide. To attain the added advantage of buffering the solution against a decrease in pH, the second component should be selected from the narrower group consisting of sodium and potassium carbonates (including bicarbonates), phosphates and borates. It is contemplated that in some situations where a maximum rate of reaction is not essential, the oxidizing substances within the last defined narrow grouping, that is, the potassium and sodium carbonates, phosphates and borates, may be employed independently of the halides, but without attaining the highly desirable catalyzing effect of the halides.

From the above discussion, it will be understood that the optimum treating solution contains a first dissolved component composed of one or more substances from the group consisting of potassium iodide, sodium iodide, potassium bromide and sodium bromide, and a second dissolved component consisting of one or more compounds from the group which consists of the sodium and potassium carbonates, phosphates and borates.

The pH of the treating solution should be controlled, by the mentioned buffering compound if one is present and by other means if this buffering compound is not present, to remain, between about 7 and 8.5, and preferably between 7.5 and 8.2, as the solution leaves the electrolytic cell and before it is contacted with the fluid to be treated. Higher pH values tend to induce the formation of oxygen in the electrolytic cell, while lower pH values greatly reduce the effectiveness of the solution in removing HS from the fluid being treated.

To describe more specifically the treating substances falling within the above defined classes, most of the halides and other useable oxidizing compounds are set out in the following chart, in which the lower oxidation state of each compound is set forth in the left hand column, while the higher oxidation state is given in the right hand column:

| Lower oxidation state | Higher oxidation state |
| --- | --- |
| (1) Potassium iodide, KI | Potassium tri-iodide, KI₃ (sometimes considered to be KI-I₂). |
| (2) Sodium iodide, NaI | Sodium tri-iodide, NaI₃ (or NaI-I₂). |
| (3) Potassium bromide, KBr | Potassium tri-bromide, KBr₃ (or KBr-Br₂). |
| (4) Sodium bromide, NaBr | Sodium tri-bromide, NaBr₃ (or NaBr-Br₂). |
| (5) Sodium carbonate, Na₂CO₃ | Sodium peroxydicarbonate, NaHC₂O₈. |
| (6) Sodium bicarbonate, NaHCO₃ | Sodium peroxydicarbonate, NaHC₂O₈ (Na₂CO₃ converts to NaHCO₃ by combination with CO₂ in the gas being treated). |
| (7) Potassium carbonate, K₂CO₃ | Potassium peroxydicarbonate, KHC₂O₈. |
| (8) Potassium bicarbonate, KHCO₃. | Potassium peroxydicarbonate, KHC₂O₈. |
| (9) Lithium carbonate, Li₂CO₃ | Lithium peroxydicarbonate, LiHC₂O₈. |
| (10) Lithium bicarbonate, LiHCO₃ | Lithium peroxydicarbonate, LiHC₂O₈. |
| (11) Sodium phosphate, Na₃PO₄ | Sodium peroxydiphosphate, Na₃PO₅. |
| (12) Potassium phosphate, K₃PO₄ | Potassium peroxydiphosphate, K₃PO₅. |
| (13) Lithium phosphate, Li₃PO₄ | Lithium peroxydiphosphate, Li₃PO₅. |
| (14) Sodium borate, NaBO₂ | Sodium peroxydiborate, NaBO₃. |
| (15) Potassium borate, KBO₂ | Potassium peroxydiborate, KBO₃. |
| (16) Lithium borate, LiBO₂ | Lithium peroxydiborate, LiBO₃. |
| (17) Disodium vanadate, Na₂VO₃ | Sodium vanadate, NaVO₃. |
| (18) Dipotassium vanadate, K₂VO₃ | Potassium Vanadate, KVO₃. |
| (19) Sodium ferrocyanide, Na₄Fe(CN)₆. | Sodium ferricyanide, Na₃Fe(CN)₆. |
| (20) Potassium ferrocyanide, K₄Fe(CN)₆. | Potassium ferricyanide, K₃Fe(CN)₆. |

The features and objects of the invention will be better understood from the following detailed description of the typical embodiments illustrated in the accompanying drawings, in which:

FIG. 1 is a diagrammatic representation of a system embodying the invention for removing hydrogen sulfide or a mercaptan from a gaseous stream;

FIG. 2 is a fragmentary representation of a portion of a second form of the invention;

FIG. 3 represents diagrammatically a third form of the invention; and

FIG. 4 represents another process embodying the invention.

Referring first to FIG. 1, I have represented at 10 an electrolytic cell into which the initial treating solution, in its lower oxidation state, is introduced through a line 11. This solution may be an aqueous solution, or may be a solution in a glycol, but containing some water for the purpose of the reaction which will be discussed hereinbelow. If a glycol is utilized, it may theoretically be any glycol, but preferably a glycol selected from the group consisting of ethylene glycol, diethylene glycol and tri-ethylene glycol, and mixtures thereof. The water utilized with such a glycol is desirably present in an amount corresponding to between about 4% and 15% of the overall solution, by weight.

Under some circumstances, virtually any concentration of the dissolved treating substances may be utilized, but preferably they are present in a total quantity of between about 1% and 25% of the overall solution, by weight.

Electrolytic cell 10 has two electrodes, an anode 12 and a cathode 13, which are supplied with direct current from a suitable source such as a battery represented at 14, and which pass current through the solution introduced into cell 10 in a manner electrolyzing that solution to convert the dissolved treating substance from its lower oxidation state given in the left hand column of the above chart, to the higher oxidation state given in the right hand column. The voltages, electrode sizes and spacing, temperatures, and other conditions are all selected in accordance with well known electrolyzing techniques and practices to attain this desired electrolytic conversion. To avoid unduly lengthening the present disclosure, no further effort will be made to elaborate on such teachings well known in the art, beyond reference to the text "Electro-Chemical Engineering," by C. L. Mantell, 4th Edition, which discusses the electrolytic art in detail, and in which I refer especially to Chapters 12 and 13.

To indicate somewhat better the nature of the change which is undergone by each of the compounds, in converting from its lower oxidation state to its higher oxidation state, it is noted that in the iodides and bromides, the iodine and bromine have a $-1$ valence in the left hand column and a zero (less negative) valence in the tri-halide form of the right hand column. In the carbonates (including the bicarbonates), the carbon atom has a valence of $+4$, while in the peroxydicarbonates to which these substances convert, the carbon atoms have a valence of $+8$. In the listed phosphates, the phosphorus atom has a $+5$ valence, while in its higher oxidation state as a peroxydiphosphate the phosphorus has a $+6$ valence. In the borates, the boron atoms have a $+3$ valence in the left hand column, while the boron in the peroxydiborates of the right hand column has a $+4$ valence. In the vanadates, the vanadium has a $+4$ valence in the left hand column and a $+5$ valence in the right hand column. In the ferrocyanides and ferricyanides, the iron has a $+2$ valence in the left hand column and a $+3$ valence in the right hand column.

It will of course be understood that the halides may be employed with any desired mixture of the other substances. In addition to the halides and other substances which may be mixed with them, I preferably include in the solution which is fed into the electrolytic cell a corrosion inhibitor, acting to prevent corrosion of any of the pipes or pieces of equipment formed of metal or the like through which the treating solution may be passed. Typical inhibitors which may be employed for this purpose are sodium, potassium, or lithium chromate; sodium, potassium, or lithium arsenate; sodium, potassium, or lithium ferrocyanide; sodium, potassium, or lithium ferricyanide; or sodium, potassium, or lithium vanadate. Preferably, the corrosion inhibitor is present in the solution in an amount between about 100 parts per million and 1500 parts per million by weight. If the corrosion inhibitor is sodium or potassium vanadate, or sodium or potassium ferrocyanide or ferricyanide, the same substance may be utilized as both the corrosion inhibiting material and as one of the two state electrolytically convertible oxidizing agents mixed with the halide or halides.

If the substance present in the solution in line 11 is potassium iodide (KI), the electrolysis products in line 17 are potassium tri-iodide (KI$_3$) and potassium hydroxide (KOH). This electrolyzing reaction, in the case of potassium iodide, may be represented as follows:

$$3KI + 2H_2O \rightarrow KI_3 + 2KOH + H_2 \qquad (1)$$

Similarly, the corresponding reactions in the case of potassium bromide, and sodium iodide and bromide are:

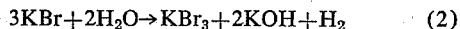
$$3KBr + 2H_2O \rightarrow KBr_3 + 2KOH + H_2 \qquad (2)$$
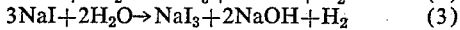
$$3NaI + 2H_2O \rightarrow NaI_3 + 2NaOH + H_2 \qquad (3)$$
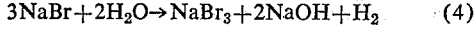
$$3NaBr + 2H_2O \rightarrow NaBr_3 + 2NaOH + H_2 \qquad (4)$$

The electrodes 12 and 13 may take the form of plates formed of any convenient conductive material which will not be attacked or adversely affected by the solution being handled. For example, anode 12 may be formed of carbon, platinum, platinum nickel, a suitable platinized ceramic, platinized titanium, lead dioxide coated carbon or titanium, or the like, and cathode 13 may be formed of copper, stainless steel, mild steel, or the like. The direct current potential applied to the plates may typically be between about 3 and 110 volts, desirably at a current density between the electrodes of between about 0.2 and 2.0 (typically about 1.5) amperes for each square inch of surface area of the plates (treating the area as one square inch when each plate has one square inch of surface).

The solution is forced continuously through the fluid tight shell or housing 15 of electrolytic cell 10 by means of a pump 16, with the intermixed products produced by the electrolyzing reaction being discharged from the cell through an outlet line 17, and of course being contained within an aqueous or glycol-aqueous solution.

In FIG. 1, it is assumed that the fluid which initially contains the hydrogen sulfide and/or mercaptan, and from which the HS radical is to be removed, is a gas. For example, this gas may be natural gas, or any other hydrocarbon gas such as ethane, methane, butane or propane. The mercaptan present in the gas may be the mercaptan of any gaseous hydrocarbon, such as methyl mercaptan, ethyl mercaptan, butyl mercaptan and propyl mercaptan, and isomers thereof. Considering somewhat more broadly the type of mercaptan which may be present, it is contemplated that, considering both gaseous and liquid streams to be treated, the mercaptan may be the mercaptan of any hydrocarbon having between 1 and 18 carbons, inclusive.

In FIG. 1, the gas to be treated, containing hydrogen sulfide and/or one or more mercaptans, is introduced into a liquid gas contactor represented at 18 through an inlet line 19. This gas passes upwardly through the contactor shell and leaves its upper end through an outlet line 20. A suitable compressor or other power source may be provided for forcing the gas stream through the contactor, with this compressor or the like being represented diagrammatically at 21.

The contactor is preferably a counterflow type of contactor, with the gas to be treated moving upwardly therethrough, and the treating liquid from electrolytic cell 10 being passed downwardly through the shell. More particularly, line 17 which feeds the higher oxidation state solution into contactor 18 is desirably connected into the upper end of the contactor shell at 22. This liquid may pass downwardly over a series of typically perforated contacting trays 23, to ultimately accumulate in the bottom of the shell as a body of liquid 24 whose level is controlled by an electrically operated valve 25 in discharge line 26. Valve 25 is in turn controlled by a liquid level control 26' whose float 27 senses the level and actuates valve 25 automatically to allow discharge from the shell of liquid at a rate or at intervals such as to maintain the desired level 28. Instead of the typically illustrated perforated plate type of gas-liquid contactor illustrated in FIG. 1, I may utilize any other conventional type of contacting column, such as a packed column, bubble cap structure, or the like.

The intimate contacting of the gas with the higher oxidation state solution delivered from electrolytic cell 15 to contactor 18 causes a reaction within the contactor between the HS radical of the hydrogen sulfide or mercaptan contaminant of the gas, and the tri-halide, as well as with any other higher oxidation state substance which may be present in the solution as it is discharged from the electrolytic cell. By virtue of this reaction, the higher oxidation state substance oxidizes the sulfur of the HS radical from S$^-$ to S$^0$, to thus change the sulfur to elemental form, so it is thereafter present as a solid distributed within the solution. This reaction also returns the higher oxidation state substance back to its lower oxidation state, in the left hand one of the above columns, for recirculation back to the electrolytic cell to again be converted to its higher oxidation state.

If the higher oxidation state substance is wholly or partially potassium tri-iodide, and the gas contaminant is hydrogen sulfide, the reaction is as follows:

$$KI_3 + 2KOH + H_2S \rightarrow 3KI + S + 2H_2O \qquad (5)$$

Similarly, if the contaminant in the gas stream is a mercaptan, represented as RSH, the reaction which occurs in contactor 18 is as follows:

$$KI_3 + 2KOH + RSH \rightarrow 3KI + S + ROH + H_2O \qquad (6)$$

In this mercaptan reaction, the R may represent any hydrocarbon radical containing between 1 and 18 carbons, inclusive.

From these reactions 5 and 6, it will be apparent that, within contactor 18, the HS radical is removed from the hydrogen sulfide and/or mercaptan, and the sulfur is reduced to elemental or free sulfur form. Also, the potassium tri-iodide is converted back to potassium iodide (KI) form.

Where the trihalide produced by the electrolytic cell is potassium tri-bromide ($KBr_3$), the reactions which occur are the same as those designated as reactions 5 and 6 above, except that bromine is substituted for iodine at all points in the reactions, as follows:

$$KBr_3 + 2KOH + H_2S \rightarrow 3KBr + S + 2H_2O \quad (7)$$
$$KBr_3 + 2KOH + RSH \rightarrow 3KBr + S + ROH + H_2O \quad (8)$$

Similarly, where the trihalide is sodium tri-iodide or sodium tri-bromide, the reactions occurring within contactor 18 are the same as reactions 5, 6, 7 and 8 for the potassium compounds, except that sodium is substituted for potassium in the reactions.

Any other convertible two state oxidizing substances which may be employed with the halides are similarly changed in condition upon contact with the fluid being treated. For instance, in the case of sodium bicarbonate, this substance is converted to sodium peroxydicarbonate by the electrolytic cell, then reacts with the HS radical in the contactor to form elemental sulfur and return the treating substance to its sodium bicarbonate form, for recirculation to and regeneration in the electrolytic cell.

The gas leaves upper outlet 20 in the same condition in which it entered inlet 19, except that the highly undesirable HS radical has been removed from the gas. The solution and contained free sulfur leaves the lower end of contactor 18 through line 26 and passes to a liquid-solids separator 29, from which the elemental sulfur discharges through an outlet 30, while the treating solution primarily in its lower oxidation state discharges separately through a line 31 leading to pump 16. The pump of course recirculates to electrolytic cell 10 the solution containing the halide and any other associated two state substances, in their lower oxidation state, to be re-electrolyzed to the higher oxidation condition, again passed through contactor 18, etc., through many continuous cycles.

Separator 29 may be any conventional type of liquid-solids separator, such as a suitable filter, a gravity separation chamber or tank, a centrifuge, or the like, preferably capable of continuously receiving the mixed liquid and solid and continuously discharging them separately.

FIG. 2 represents fragmentarily another form of the invention which may be considered as identical with that of FIG. 1 except that a reboiler 32 is connected into the line between liquid-solids separator 29a and pump 16a (corresponding to units 29 and 16 respectively of FIG. 1). This FIG. 2 arrangement is designed particularly for use with a glycol aqueous solution of the desired two oxidation state substance or substances, rather than a simple aqueous solution, with the reboiler being provided for removing from the system excess water which has been dissolved by the glycol, before recirculation of the glycol and the predetermined proportion of water back through the pump to the electrolytic cell. This cell and the liquid gas contactor 18 may be the same as in FIG. 1, and the various reactions which occur in the system may also be the same as in FIG. 1.

FIG. 3 represents fragmentarily a form of the invention which is designed especially for removing the HS radical from a hydrocarbon liquid (rather than a gas), such as, for example, gasoline, diesel fuel, kerosene, jet fuel, light lubricating oil stock, gas oil, and other refinery streams, formed of hydrocarbons having between 1 and 18 carbon atoms, inclusive. This liquid, containing hydrogen sulfide and/or mercaptans also having between 1 and 18 carbon atoms, inclusive, is introduced into a liquid-liquid contactor 18b through an inlet line 19b. The contactor may be of a counterflow type, in which the liquid being treated flows upwardly to discharge from an upper outlet 20b, while the aqueous or glycol-aqueous solution containing at least some higher oxidation state treating substance of the previously discussed type enters the upper end of contactor 18b through line 17b from electrolytic cell 10b, and discharges as a lower oxidation state solution from the lower end of the contactor through an outlet line 26b. This lower oxidation state solution in line 26b may then be passed to a liquid-liquid separator 33, for removing from the solution any of the fluid being treated which may have become intermixed with the treating solution. The treating solution may then be delivered to a pump 16b, while the separated hydrocarbon liquid is conducted through a line 34 to the main outlet 20b for the treated liquid. Pump 16b returns the solution to the electrolytic cell for regeneration or reconversion to the higher oxidation state form. The liquid-solids separator 29b (corresponding to unit 29 of FIG. 1) is represented in FIG. 3 as located beyond cell 10b, so that the latter may serve to neutralize the electrical charge of the elemental sulfur, and cause agglomeration of the colloidal sulfur for easier removal from the liquid in the settling chamber or other separator 29b. The separated sulfur discharges through a line 30b, while the higher oxidation state solution flows through a line 17b to the contactor. As will be apparent, the separator 29 or 29a of the FIG. 1 or FIG. 2 apparatus may if desired be repositioned as shown in FIG. 3, or the FIG. 3 separator may be positioned as in FIG. 1.

The reactions which occur in the case of the liquid treating system of FIG. 3 are the same as have been set forth in connection with FIG. 1, with the result that the apparatus and process act to effectively remove the hydrogen sulfide radical from the liquid which enters at 19b and discharge at 20b. In all forms of the invention, the electrolytic cell is designed and energized to produce a slight excess of higher oxidation state substance, such as potassium tri-iodide or the like, over and above the amount needed to actually remove all of the HS radical from the incoming stream of gas or liquid, to thereby make certain that all of the HS radical is completely removed.

FIG. 4 shows an arrangement in which the treating fluid, in its higher oxidation state condition, is pressurized after leaving electrolytic cell 15c, and before entering contactor 18c, by a pump 117c. This pump may act to maintain a pressure at its discharge side which is considerably higher than the pressure at which pump 16c delivers the returning liquid to electrolytic cell 15c. For example, pump 117c may maintain a pressure of approximately 85 pounds per square inch at its discharge side, while pump 16c may maintain only a very slightly superatmospheric pressure at its discharge side, typically about one and one-half pounds per square inch. The gas to be treated may also be pressurized as it enters contactor 18c, by a compressor represented at 21c, to maintain the entire contents of contactor 18c under a superatmospheric pressure (typically about 85 pounds per square inch), and thereby encourage the reaction in the contactor. A pressure reducing valve 118c may be connected into the gas discharge line 20c from the contactor, to reduce the pressure of the discharge gas.

The electrolysis within cell 15c acts to produce some gaseous hydrogen in the fluid stream leaving the cell, which gas would tend to react with the higher oxidation state substance in the solution under the increased pressure produced by pump 117c. For this reason, I introduce into the line at the suction side of pump 117c a surge tank 35, having a vent line 36 through which the hydrogen gas is vented into discharge line 20c, to mix with the discharging treated gas from contactor 18c.

Instead of the single separator 29 of FIG. 1, the arrangement of FIG. 4 utilizes a flotation cell 37, which removes substantially all of the sulfur and a small amount of liquid from the main body of solution, by flotation, with the sulfur and small amount of liquid going to a separator 38, and the remaining clear solution discharging through a line 31c to pump 16c. The separator 38 further separates out the small amount of liquid which is initially mixed with the solid sulfur, and discharges that liquid into line 31c, while delivering the separated sulfur through a line 30c to a discharge location. Float controlled valve 25c at the bottom of contactor 18c may be designed to function as a pressure reducing valve, for reducing the pressure of the fluid passing to the flotation cell, separator and low pressure pump 16c.

If the conductivity of the solution is less than would be desired in the electrolytic cell, an appropriate electrolyte may be added in sufficient quantity to attain a proper current flow. For this purpose, I may typically utilize sodium chloride or potassium chloride.

Suitable cathode depolarizers may be added to the solution, in accordance with known electrolyzing procedures, for adsorbing hydrogen from the surface of the cathode and thereby reducing the required voltage. The following substances may be used as these cathode depolarizers:

Sodium ferricyanide
Potassium ferricyanide
Sodium chromate
Potassium chromate
Sodium fluoride
Potassium fluoride These substances may be present in appropriate proportions to serve the depolarizing function, desirably, between about 0.015 and 0.15 percent of the overall solution.

It is contemplated that some but not all of the advantages of the invention may be attained by a further variational arrangement in which only a part of the previously discussed apparatus need be maintained at the actual fluid treating location, such as at a well, pipeline, or other field location, with the electrolytic regenerating apparatus being normally kept elsewhere. More specifically, there may be maintained at the field location only a contactor (such as that shown at 18 in FIG. 1, or its equivalent), a storage tank for holding a supply of the treating solution in its higher oxidation state, pumping means for passing this solution through the contactor, and a second tank for receiving the solution in its lower oxidation state after passage through the contactor. The solution in the second tank may then be regenerated only periodically, either by return to a central regenerating station and passage through an electrolytic cell at that station, or by passage through such a portable cell carried by a truck driven to the location of the contactor.

To assure a full and complete disclosure of the present invention, the following specific examples are given of certain typical processes embodying the invention:

Example 1

Utilizing the apparatus shown in FIG. 1, an aqueous solution of potassium iodide (1% by weight) was circulated through an electrolytic cell such as that shown at 10, having electrodes formed of nickel and platinized nickel, each with 35 square inches of surface area. A 9 volt direct current potential was impressed across the electrode plates, to produce a current of 50 amperes through the solution. This current consumption produced 1.92 milliequivalents of potassium tri-iodide in two minutes. Hydrogen sulfide was then generated in a Kipp generator by the addition of a 37% hydrochloric acid solution to ferrous sulfide at the rate of 2 milliequivalent per minute. The hydrogen sulfide thus produced was introduced at 19 into contactor 18, to contact the electrolyzed potassium iodide solution, now containing potassium tri-iodide, and entering the contactor through line 17. The gas leaving the contactor through line 20 was tested with wet lead acetate paper, and proved to be free of the HS radical. The liquid from the contactor was withdrawn to a separator such as that shown at 29 in FIG. 1, and taking the form particularly of a gravity separator, which separator removed the solid elemental sulfur from the solution, following which the solution was recirculated to the electrolytic cell.

The apparatus was operated at one time for an accurately timed interval, to determine quantitatively whether the hydrogen sulfide and potassium tri-iodide were reacting stoichiometrically. For this test, the electrolytic cell 10 was operated for two minutes to produce 1.92 milliequivalents of potassium tri-iodide, and the current was then turned off while hydrogen sulfide was passed through the contactor, in contact with the potassium tri-iodide solution. The presence of hydrogen sulfide in the discharge from the contactor was determined by wet lead acetate paper, which showed that sulfide appeared at the discharge after one minute and fifty-five seconds. This period was determined to be equivalent to 3.82 milliequivalents of hydrochloric acid utilized in preparation of the hydrogen sulfide, which indicated that the hydrogen sulfide and potassium tri-iodide reacted stoichiometrically.

This example was repeated with carbon dioxide added to the hydrogen sulfide, and it was determined that the $H_2S$ could be removed selectively without removing the carbon dioxide from the gas stream.

Example 2

In apparatus constructed in accordance with the showing in FIG. 4, a natural gas containing 7.2 grains of hydrogen sulfide per 100 standard cubic feet was treated by a solution containing five percent sodium carbonate and one-tenth of one percent potassium iodide, by weight, as well as 0.05 percent sodium chromate (by weight) which was added as a corrosion inhibitor. The sodium carbonate was converted by the electrolytic cell 15c to sodium peroxydicarbonate, and the potassium iodide was of course converted to potassium tri-iodide. The contactor 18c was a packed column contactor. Carbon electrodes was utilized in the electrolytic cell, each electrode having 48 square inches, and the two electrodes being spaced one-half inch apart. The current flow was 1.5 amperes per square inch. The pressure in contactor 18c was 85 pounds per square inch, and the pressure at the discharge side of pump 16c was one and one-half pounds per square inch. The discharge gas was cleaned to a condition in which it was substantially free of $H_2S$, and specifically contained .03 grains per 100 standard cubic feet.

This example was tried both with and without the iodide, and it was learned that the small amount of iodide acted as a catalyst, and served to greatly increase the rate of reaction in the contactor, and therefore decrease the size of contactor required for treating gas at a particular predetermined rate. The sodium chromate did not affect the reaction, but protected metal parts of the apparatus against corrosion.

Various other ones of the two state oxidizing substances were employed with different amounts of potassium iodide, sodium iodide, lithium iodide, and the corresponding bromides, and with different ones of the previously listed corrosion inhibitors. All of these halides, and especially those of potassium and sodium, were found to be catalytic in conjunction with any of the listed non-halide two state oxidizing substances. This was true even when the halide was present in a much smaller percentage than the other substance, as for example, in percentages between about one one-hundredth of one percent and one-tenth of one percent of the overall solution, by weight.

Example 3

Example 2 was repeated, but changing the solution to an aqueous solution containing, by weight, one and one-half percent sodium carbonate, one and one-half percent sodium phosphate, and one-tenth of one percent potassium iodide. This mixture, in the FIG. 4 apparatus, reduced the hydrogen sulfide content of natural gas from 7.2 grains per 100 standard cubic feet to 0.03 grain per 100 standard cubic feet.

Example 4

In this example, a three percent aqueous solution of potassium bromide was utilized as the treating solution, and was handled in the same manner discussed in connection with Example 1. The gas treated in this case was a natural gas stream taken directly from a gas well on location, with the gas containing 4.26 grains of hydrogen sulfide per 100 standard cubic feet. A bubble type contactor was employed instead of contactor 18, with the gas stream being passed first through a capillary tube to control its flow rate, and then being introduced into the lower end of the bubble contactor. A 10 percent cadmium sulfate solution was used as an absorbent solution for determining the presence of $H_2S$ in the discharge line 20 leading from the contactor. The potassium tri-bromide solution functioned to remove hydrogen sulfide from the gas to a value of 0.013 grain per 100 standard cubic feet. As in prior examples, the potassium bromide was regenerated by passage through the electrolytic cell, for recirculation to the contactor.

This same solution was used to treat a natural gas containing 40 grains of hydrogen sulfide and mercaptans per 100 standard cubic feet of gas, and reduced the HS radical to 0.041 grain per 100 standard cubic feet.

Example 5

Utilizing the apparatus illustrated in FIG. 3 of the accompanying drawing, and described in detail hereinabove, a kerosene stream from a refinery was introduced into the liquid-liquid contactor 18b through line 19b while a 5% aqueous solution of potassium iodide was employed as the treating solution. This solution was passed through electrolytic cell 10b, in which some of the potassium iodide was converted to potassium tri-iodide, to enter the upper end of contactor 18b and flow downwardly therethrough. The kerosene initially introduced into the system was analyzed, and contained 0.42 percent sulfur, all present in the form of mercaptans having boiling points within the kerosene range. After contacting, the kerosene leaving the system through discharge line 20b has a sulfur content of only 0.0031 percent, thus showing that the removal of the mercaptans was very thorough and effective. The sulfur thus removed was left in the circulation system as the solution passed through electrolytic cell 10b, to have its colloidal charge neutralized by that cell, with resultant agglomeration of the sulfur to facilitate its removal in separator 29b. The rate of flow of the liquids through the contactor 18b was such that 500 milliliters of kerosene were contacted with 500 milliliters of the electrolyzed potassium iodide solution, containing potassium tri-iodide.

Example 6

This example is the same as Example 5, except that 5% aqueous solutions of sodium iodide, potassium bromide and potassium iodide were substituted during three different tests for the potassium iodide solution, with sulfur removing effectiveness as satisfactory as that set forth in Example 5.

Example 7

This example was performed with apparatus as shown in FIG. 1, and described in connection with that figure, with the treating solution being a 5 percent glycol-aqueous solution of potassium iodide, and with the liquid being 90 percent diethylene glycol, and 10 percent water. The gas stream being treated was natural gas containing 6.2 grains of hydrogen sulfide per 100 standard cubic feet and 4.7 grains of mercaptans per 100 standard cubic feet. The gas discharged from the contactor contained only 0.023 grain hydrogen sulfide per 100 standard cubic feet and 0.09 grain of mercaptans per 100 standard cubic feet.

Example 8

In this example, the same gas designated in Example 7 was treated, in apparatus of the FIG. 1 type, with a solution which, prior to electrolysis, was a 5 percent solution of potassium bromide in a liquid consisting of 90 percent tri-ethylene glycol and 10 percent water. The discharge gas contained 0.008 grain hydrogen sulfide per 100 standard cubic feet and 0.013 grain of mercaptans per 100 standard cubic feet.

Example 9

A gas stream as defined in Example 7 was treated in apparatus of the FIG. 1 type, with 90 percent glycol, 10 percent aqueous solutions of potassium iodide (5 percent) and various amounts of the different carbonates, phosphates, borates, vanadates and ferrocyanides referred to in this application, in different mixtures and individually with the potassium iodide. The combined hydrogen sulfide and mercaptan content was in each case reduced to a value lower than .03.

Example 10

Example 5 was repeated with each of the following liquid hydrocarbons being substituted for kerosene as the fluid being treated:

(1) Gasoline from a catalytic cracker, containing 280 parts per million of mercaptans before treatment, and 5 parts per million after treatment.

(2) Cycle oil from a catalytic cracker, initially containing 410 parts per million of mercaptans, and containing only 20 parts per million of mercaptans after treatment.

(3) Coker light gas oil, initially containing 1750 parts per million of mercaptans, and upon discharge containing only 110 parts per million.

(4) Coker gasoline, whose mercaptans content was reduced by the process from 650 parts per million to 25 parts per million.

(5) Catalytic cracker gas oil, whose mercaptans content was reduced from 320 parts per million to 10 parts per million.

The results were in each case almost complete removal of the HS ion from the liquid.

Example 11

The process of Example 1 was followed, utilizing the apparatus of FIG. 1, but with the treating solution being a 5 percent aqueous solution of sodium iodide, and the treated fluid being a gas stream consisting of 25 percent hydrogen sulfide and 75 percent carbon dioxide. The electrolytic cell was operated at 7 volts and 4.5 amperes, and the stream of treating solution leaving the cell contained 1.77 grams of $I_2$, in the form of sodium tri-iodide, for 2000 milliliters of the solution. The exit stream leaving the contactor proved by test with lead acetate paper to contain no hydrogen sulfide but contained the carbon dioxide substantially unaffected.

Example 12

This example is the same as Example 1 except that the treating solution was a 10 percent aqueous solution of sodium bromide, which was utilized to treat a gas stream containing 25 percent hydrogen sulfide and 75 percent carbon dioxide. The electrolytic cell was operated at 7 volts and 4.5 amperes, and the solution entering the contactor contained 0.86 gram of $Br_2$, present as sodium tri-bromide. An analysis of the exit gas showed that the hydrogen sulfide but not the carbon dioxide had been removed from the gas.

Example 13

Same as Example 1, but with the treated fluid being a gas consisting substantially entirely of hydrogen sulfide, and the treating solution consisting of 1800 milliliters ethylene glycol, 200 milliliters water, 50 grams sodium bromide, and 50 grams sodium iodide. The treatment served to effectively remove all of the hydrogen sulfide, since tests with lead acetate paper showed no hydrogen sulfide present in the discharge from the upper end of the contactor.

Example 14

In apparatus of the FIG. 1 type through which 12 million cubic feet of natural gas per day were passed, an aqueous treating solution was utilized containing 3 percent potassium iodide, 4.5 percent potassium tetraborate, and .15 percent potassium dichromate (corrosion inhibitor). A potential of 32 volts was supplied to the electrolytic cell, which cell contained a large number of electrodes of large surface area, with a resultant current flow of 4000 amperes. The amount of hydrogen sulfide in the gas was reduced from 21 grains to .08 grain per 100 standard cubic feet of gas. The potassium iodide, besides reacting directly (in triiodide form) with the HS radical as an oxidizing agent, also acted to catalyze and increase the rate of conversion of the potassium tetraborate between its two different oxidation states, while the tetraborate at the same time served its secondary function, as a buffering agent, in preventing the carbon dioxide content of the gas (which was very substantial) from reducing the pH of the treating solution below 7.5. The actual pH of the treating solution upon entry into the contacting vessel was 7.8.

Example 15

In apparatus of the FIG. 1 type, 4.5 million cubic feet per day of natural gas were treated by an aqueous solution containing one percent potassium iodide, 4.5 percent tri-sodium phosphate, 2 percent sodium carbonate, and .15 percent potassium ferrocyanide. At a potential of 29 volts in the electrolytic cell, and a current flow of 2000 amperes, the hydrogen sulfide content of the gas was reduced from 28 grains to .25 grain per 100 standard cubic feet. The pH of the solution leaving the electrolytic cell was 7.6.

This same gas was treated at the same rate with the solution containing 1.5 percent potassium iodide, 4.5 percent potassium carbonate, .15 percent potassium bichromate (corrosion inhibitor), and 8 percent potassium chloride (to increase the conductivity and increase the current flow to 4000 amperes, with a potential of 29 volts). The hydrogen sulfide was removed substantially completely from the gas, while carbon dioxide in the gas passed through the system unaffected.

Example 16

In apparatus of the FIG. 1 type, a natural gas containing 16 grains of mercaptans was treated with an aqueous solution containing 5% sodium bromide, 5% potassium carbonate, and 15% potassium ferrocyanide, with the pH of the solution at the entrance to the contactor being 7.9. The mercaptan content was effectively reduced to only a trace in the discharge gas.

In each of the examples in which the pH has not been specifically designated, the pH of the solution at the entrance to the contactor was maintained by the buffering compound or otherwise at a value between 7.0 and 8.5, and in most instances between 7.5 and 8.5.

I claim:

1. The process for removing the HS radical from fluid to be treated, that comprises subjecting to an electrolyzing current a solution containing at least one dissolved halide selected from the group consisting of potassium iodide, potassium bromide, sodium iodide and sodium bromide, thereby electrolytically converting at least some of said halide to a tri-halide in said solution, contacting fluid to be treated containing said HS radical with said solution, reacting said HS radical with said tri-halide in said solution to form elemental sulfur and, in said solution, the same halide originally subjected to said electrolyzing current, subsequently subjecting said solution to an electrolyzing current to again form said tri-halide in the solution, and repeating all of said steps through a series of cycles thereof.

2. The process as recited in claim 1, in which said fluid is a liquid hydrocarbon.

3. The process as recited in claim 1, in which said fluid is a hydrocarbon gas.

4. The process as recited in claim 1, including removing said elemental sulfur from the solution at some time during each of said cycles.

5. The process as recited in claim 1, including maintaining the pH of said solution upon leaving said cell at between about 7 and 8.5.

6. The process as recited in claim 1, in which said solution also contains at least one additional substance selected from the group consisting of the sodium, potassium and lithium carbonates, phosphates and borates, disodium vanadate, dipotassium vanadate, sodium ferrocyanide and potassium ferrocyanide; said process including electrolytically converting said additional substance to a higher oxidation state by said electrolyzing current during each of said cycles, reacting said HS radical with said additional substance in said higher oxidation state upon said contacting of the fluid being treated with said solution, and thereby forming additional elemental sulfur and returning said additional substance to said lower oxidation state.

7. The process as recited in claim 1, in which said solution also contains at least one additional substance selected from the group consisting of the sodium and potassium carbonates, phosphates and borates; said process including electrolytically converting said additional substance to a higher oxidation state by said electrolyzing current during each of said cycles, reacting said HS radical with said additional substance in said higher oxidation state upon said contacting of the fluid being treated with said solution, thereby forming additional elemental sulfur and returning said additional substance to said lower oxidation state; and maintaining said solution against a drop in pH below 7 by the buffering effect of said additional substance.

8. The process as recited in claim 7, including removing said elemental sulfur from the solution during each of said cycles after said contacting of the fluid with said solution and before resubjecting the solution to electrolyzing current.

9. The process for removing the HS radical from fluid to be treated, that comprises subjecting to an electrolyzing current a solution containing at least one dissolved halide selected from the group consisting of potassium iodide, potassium bromide, sodium iodide, sodium bromide, lithium iodide, and lithium bromide, thereby electrolytically converting at least some of said halide to a tri-halide in said solution, contacting fluid to be treated containing said HS radical with said solution, reacting said HS radical with said tri-halide in said solution to form elemental sulfur and, in said solution, the same halide originally subjected to said electrolyzing current, subsequently subjecting said solution to an electrolyzing current to again form said tri-halide in the solution, and repeating all of said steps through a series of cycles thereof.

10. The process for removing the HS radical from fluid to be treated, comprising subjecting to an electrical current a solution containing at least one dissolved substance in a lower oxidation state selected from the group consisting of the sodium and potassium carbonates, phosphates and borates, electrolytically converting said substance from said lower oxidation state to a higher oxidation state, contacting fluid to be treated with said solution of the substance in said higher oxidation state, reacting said HS radical with said substance in said higher oxidation state and thereby forming elemental sulfur and returning said substance to said lower oxidation state, subsequently subjecting said solution, containing the substance returned to its lower oxidation state, to an electrical current to again convert said substance to its higher oxidation state, and repeating all of said steps through a series of cycles thereof.

11. The process as recited in claim 1, in which said fluid is a hydrocarbon gas, and said solution contains either potassium iodide or sodium iodide.

12. The process as recited in claim 1, in which said fluid is a hydrocarbon gas, and said solution contains potassium iodide.

References Cited

UNITED STATES PATENTS

| | | | |
|---|---|---|---|
| 1,435,824 | 11/1922 | Dunston | 204—136 |
| 2,809,930 | 10/1957 | Miller | 204—136 |

JOHN H. MACK, *Primary Examiner.*

H. M. FLOURNOY, *Assistant Examiner.*